Feb. 3, 1959 V. SCHLEYER ET AL 2,872,415
DOMESTIC WATER TREATMENT PROCESS
Original Filed April 13, 1954 2 Sheets-Sheet 1
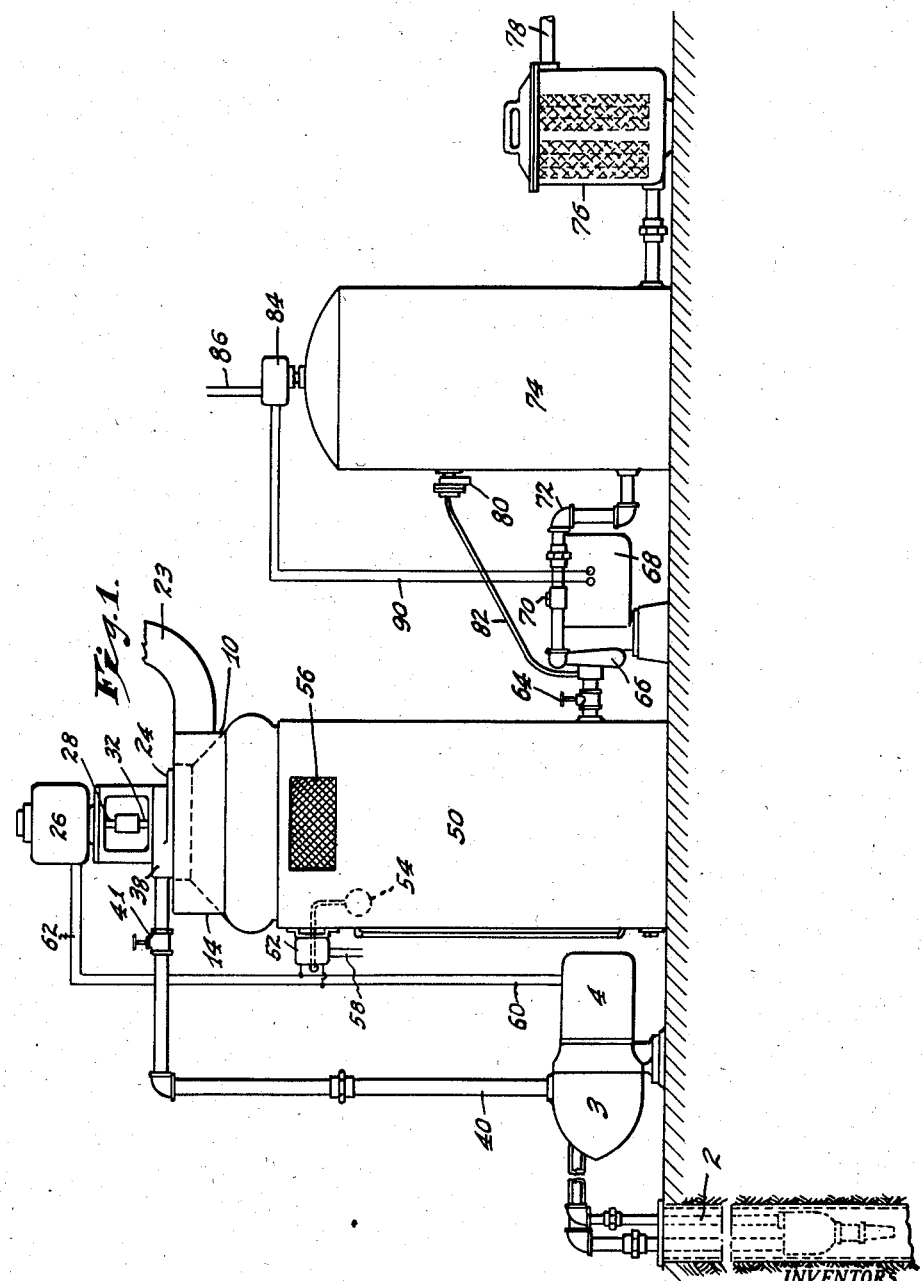
INVENTORS
VICTOR SCHLEYER,
BY JACK L. HENRICKS and
ROBERT ROY BAXTER,
ATTORNEYS.

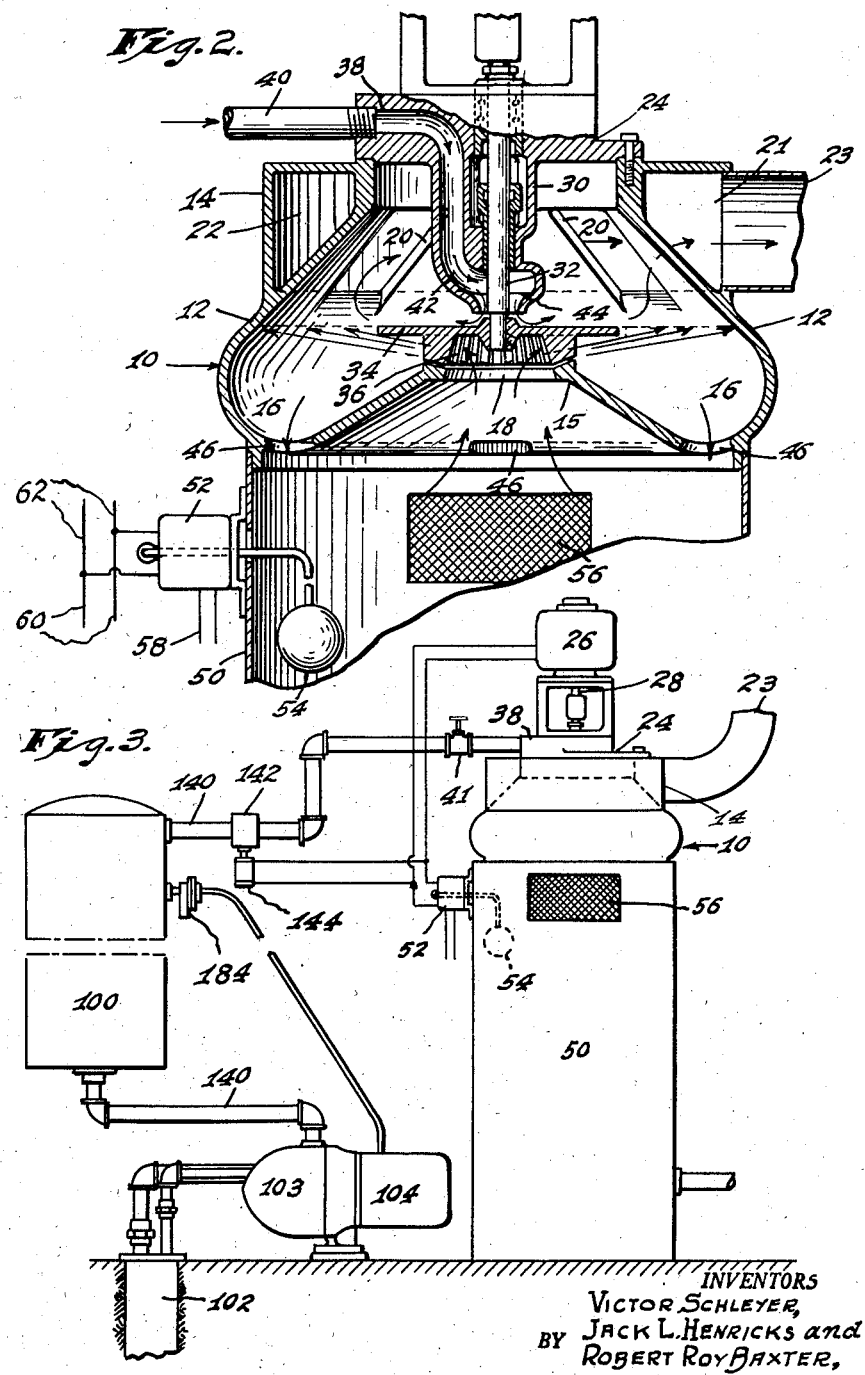

United States Patent Office 2,872,415
Patented Feb. 3, 1959

2,872,415

DOMESTIC WATER TREATMENT PROCESS

Victor Schleyer and Jack L. Henricks, Edgewood, and Robert Roy Baxter, Anderson, Ind., assignors to E. C. Schleyer Pump Company, Inc., Anderson, Ind., a corporation of Indiana Original application April 13, 1954, Serial No. 422,811, now Patent No. 2,811,258, dated October 29, 1957. Divided and this application July 23, 1956, Serial No. 602,481

4 Claims. (Cl. 210—63)

This invention relates to a method and apparatus for purifying water, especially adapted and suited for domestic use. This application is a division of application Serial No. 422,811, filed April 13, 1954, now Patent No. 2,811,258, as a continuation-in-part of our prior application Serial No. 194,244, filed November 6, 1950, now abandoned.

It is the primary object of our invention to provide water-treatment apparatus adapted to be embodied as an integral part of a domestic water-supply system, which will be reasonable in cost and small in physical size, which will operate automatically and reliably with a minimum of attention, and which, above all, will be highly effective to purify and clarify a wide variety of the waters encountered in domestic water-supply sources. It is a special object of the invention to provide household water-treatment apparatus which may be handled and sold as a unit and installed as such in any convenient location, such as in a utility room, basement, or the like, and which as a small, simple, easily installed automatic unit will effectively purify water at a rate abundantly adequate for household water use requirements. It is an object of our invention to provide such an apparatus and method which in most common water conditions will purify and clarify water without the addition of chemicals, such as inhibitors, chemical oxidizing agents, flocculating agents, etc. to the water, but which is readily adapted for combination with such chemical treatments where extreme conditions require it.

In general, our water-treatment system utilizes a step of oxidizing the water with oxygen from the air. While oxidation with air has been previously used, as to convert dissolved iron components to insoluble iron oxides, and while exposure of the water to the air has previously been used to reduce the amount of contaminating gases contained in the water, and thus to reduce the bad odor and taste of the water, the previous apparatus and methods have been either relatively ineffective and unsatisfactory, producing only a relatively incomplete amount of oxidation, or have been so cumbersome and expensive as to be unsuitable for convenient domestic installation and operation. We have discovered how complete elimination of objectionable absorbed gases and complete oxidation of oxidizable substances may be accomplished rapidly in apparatus of small physical size and reliable automatic operation, and how such complete oxidation can be utilized to produce highly effective water purification in such apparatus.

In Florida, with its many luxurious residences and resort areas, a serious water problem has long existed. The water from available sources is almost always of extremely bad taste and odor, is frequently acidic, often contains objectionable amounts of iron and other metal salts, etc. Many and various proposals have been made and many tried for purifying the local water, yet the problem of bad water still persists as a general and widespread problem, especially in areas not served by large city-water systems. A number of installations of our apparatus have been made in Florida, and in every case our apparatus produced results which were startling and surprising to consumers and other persons who were familiar with the problem and with the extensive previous attempts to overcome it. Our apparatus has displaced a variety of previously available water-treatment apparatus. It has produced results which representatives of the Florida State Board of Health first told us were impossible but which they later confirmed by their own tests.

In general, in accordance with our invention, the water is first atomized at atmospheric pressure from a spinning-disk atomizer into and violently mixed with a controlled stream of air, and the mixture forcefully impinged against a barrier, in apparatus which we refer to as an atomizing-oxidizing device, and which we have discovered produces both substantially complete gas elimination and a substantial oxidization during the rapid passage of the water through it, and which in that quick treatment substantially completely saturates the water with oxygen from the air. The oxygen-saturated water is delivered to a detention tank exposed to the atmosphere, and is held in that tank for a detention period, which may be quite short and preferably of at least twenty minutes, and conveniently not more than sixty minutes. During this detention time, the absorbed oxygen in the water produces a continuing purification action. The resulting water has its oxygen demand completely satisfied. Bacteria are destroyed by the mechanical and oxidizing treatment. Gases which cause odor and bad taste are completely eliminated, and gases which tend to maintain other impurities in solution, are likewise eliminated, to permit effective removal of the impurities which they tend to maintain dissolved. The acidic pH value of the water is brought substantially to the basic pH range. Many dissolved impurities are changed to insoluble oxides, becoming suspended solids which may then be filtered out.

The water is desirably filtered before use, and the treated and filtered water is crystal clear, is free from odor and bad taste, and is stable, the oxygen demand being satisfied.

For the atomizing-oxidizing treatment, we preferably use a device which in some respects resembles that disclosed in the La Bour Patent No. 1,318,774, which La Bour proposed for general processes of mixing gases and liquids, as for "purposes of evaporation," to produce chemical reactions, for "washing and moistening air," and "to absorb chemical vapors or gases in liquids." We have modified the La Bour apparatus in certain respects, and have discovered that in contrast to La Bour's teaching of "absorbing" chemical vapors or gases, our atomizing-oxidizing treatment will completely remove contaminating gases from water.

We have discovered further that our apparatus will completely saturate water with oxygen from air. The completeness with which the water is saturated with oxygen in our extremely short treatment time and at the rapid rate of treatment is quite unexpected and surprising, for even incomplete saturation has previously been thought to require relatively long and slow exposure to air. With the completeness of oxygen saturation which we obtain at a rapid rate, in combination with the oxidation and gas elimination which occurs during the treatment, a detention time provided for further reaction can be surprisingly short, and the combination result includes even the removal of highly soluble contaminants from the water and the neutralization of originally acid water.

In this atomizing-oxidizing treatment, the raw water is atomized from a rotating head, such as a spinning disk, preferably in an expending discharge sheet from the periphery of the disk, into violent admixture with a converging blast or stream or air from a power blower, preferably an expanding blanket-like stream concentrically discharged at a small angle of convergence with the discharge sheet of atomized water. The intermixed water and air are subjected to a forcible impingement against an inclined barrier which deflects the water droplets downward from the generally upwardly flowing air, the barrier being preferably a conical wall concentric with the water and air discharge. The atomization of the water and its admixture with the air are carried out at atmospheric pressure, and desirably within a casing whose walls serve as the impingement barrier, and from which the air and separated gases are continuously and promptly lead off from the top, above the mixing zone, and from which the water is drained from the bottom.

The preferred form of casing is generally conical, with its walls against which impingement occurs disposed at an angle of not more than about 45° to the plane of rotation of the atomizing disk, to ensure that water collecting thereon will flow downward. Above the impingement zone, the wall contains air-outlet openings spaced about its periphery, which lead to an annular air chamber or passage and which desirably extend to the bottom of that passage so that any water collecting in the air passage can drain back to the main chamber. The air chamber or passage has an outlet, preferably not aligned with any air outlet in the conical wall, for connection to a gas-discharge stack. Below the impingement zone, the casing wall curves smoothly downward and inward to form an upwardly open annular trough about a central air-inlet opening leading to the center of the blower formed on the bottom side of the spinning disk.

The casing desirably has a removable top casting which carries the spinning disk and its driving motor, and which is formed to provide a water-inlet passage leading to an annular outlet about the shaft of the disk.

This atomizing-oxidizing device is conveniently mounted so that its water-collecting trough drains by gravity to a detention tank, and for household installation is preferably mounted on top of an upright detention tank of suitable size in an assembly adapted to be installed as a unit, and in which the blower draws air from the tank. The upper portion of the detention tank is provided with air-inlet openings which admit air to the blower of the oxidizing-atomizing device, and the arrangement ensures air flow through the tank and tends to subject the water in the tank to a sub-atmospheric pressure. Both the air-inlet openings and the stack-outlet are desirably screened, to exclude insects from the water circuit.

The treated water detained in the detention tank undergoes further purifying action by reason of its saturation with oxygen, and gases may continue to be discharged from it into the air drawn through the tank by the blower. Water for use is withdrawn from the tank, preferably through a filter.

For automatic operation, a water-level responsive switch on the detention tank controls both the water supply and the driving motor for the atomizing-oxidizing rotor. Where the water supply is direct from a well pump, the switch desirably controls that pump directly. Where the water supply is from a public utility source or from a raw water-supply tank, it is connected to the atomizing-oxidizing device through a suitable automatic valve controlled by the tank switch.

The rate of water supply and the size of the detention tank are inter-related to the expected water demand. Household water systems commonly have a normal water demand not exceeding about 240 gallons per day, and for this, water may be treated by periodic operation of the atomizing-oxidizing device running at say 3450 R. P. M. at an operating rate of up to about 10 gallons per minute, and the detention tank may be of 30-gallon capacity, which will give a normal water-detention time of at least twenty minutes. When the water demand is higher, the same oxidizing unit may be used (and operated at more frequent or longer periods) and combined with a sufficiently larger detention tank to secure the minimum detention time. Air is supplied to the device at a rate proportional to the water-feed rate, and we preferably use a blower which at 3450 R. P. M. supplies from 5 to 10 cubic feet, and most desirably about 7.5 cubic feet, of air for each gallon of water fed. Thus with a water-feed rate of 10 gallons per minute, we preferably blow 75 cubic feet of air per minute through the device.

In a domestic installation, water is preferably withdrawn from the tank by a booster or pressure pump which delivers the water to an air-chamber pressure tank, and the pump is operated in accordance with demand, as by pressure-responsive controls responsive to pressure in the tank. A filter is desirably included in the water-delivery apparatus, to filter the treated and detained water before use. Where the water conditions are such that the amount of solids required to be removed from the water is not excessive, we prefer to place the filter in the delivery line from the pressure tank, (which ensures obtaining the desired minimum reaction time prior to filtering, as when there are short periods of an abnormally high rate of water use) and to use a filter of the type containing replaceable fibrous cartridges, as of the wound-cotton type shown in Patent No. 2,368,216. Where the amount of solids to be removed is higher other or additional filters may be used, and a filter may be combined in the apparatus in the line between the pressure pump and the tank.

The accompanying drawings illustrate the invention. In such drawings:

Fig. 1 shows a preferred embodiment of the invention in a domestic-water supply system, supplied with water directly from a well pump;

Fig. 2 is an enlarged sectional view of the atomizing-oxidizing device and the upper end of the detention tank; and Fig. 3 is a view similar to Fig. 1, but showing a modified system in which the well pump delivers water to a raw-water storage tank from which water is delivered through a control valve to the purification apparatus.

In the apparatus shown in Figs. 1 and 2, the water supply is from a well 2 connected to a pump 3 driven by a motor 4. The atomizing-oxidizing apparatus comprises a bell-shaped casing 10 forming what we refer to as an atomizing-oxidizing chamber. The main outer wall 12 of such chamber is formed as the wall of a cone of 90° apex angle, carries a collar 14 adjacent the top, and is smoothly curved downward and inward at the bottom to form an annular trough 16. The inner edge or lip 15 of the trough 16 defines an air-inlet opening 18, and the upper part of the wall 12 is provided with a series of four circumferentially spaced air-escape openings 20 leading to an annular-collecting chamber 22 formed between the wall 12 and the collar 14 and through which the air is discharged from the device. An outlet 21 from this chamber 22, preferably not aligned with any opening 20, leads to a stack 23. The openings 20 extend downward to the bottom of the chamber 22, to permit any water which collects therein to drain back to the main chamber within the wall 12.

A cover casting 24 is mounted at the top of the wall 12 and supports a driving motor 26 with its shaft 28 disposed vertically and concentric with the wall 12 of the casing. Within the casing 10 the cover casting 24 forms a depending bearing support 30 in which is journalled a drive shaft 32 coupled to the motor shaft and which carries at its lower end a rotor 34, which in our standard household unit is of 8-inch diameter. The upper surface of such rotor 34 is desirably a smooth surface, preferably flat. It may be either of metal or some synthetic resin. The lower surface of the rotor 34 carries a circumferential series of blades 36, preferably wider at their inner ends than at their outer ends, and extending into close running relationship with the lip 15 of the trough 16. In our standard household unit adapted to handle water at an operating rate of 10 gallons per minute, the blower is designed to supply 75 cubic feet per minute of air at a rotor-operating speed of 3450 R. P. M. The casting 24 and bearing support 30 are formed to provide a liquid-inlet conduct 38 terminating at its inner end at an annular-discharge chamber 42 surrounding the lower end of the shaft 32 and having an annular outlet 44 about the shaft 28 at the center of the upper face of the disk or rotor 34. The outlet from the pump 3 is connected by a pipe 40, preferably through a valve 41, to the inlet conduit 38.

The casing 10 is mounted on top of an upright cylindrical detention tank 50. The trough 16 is provided with suitable drain openings 46 which open directly to the top of the tank 50. An automatic switch 52 mounted on the side of the tank 50 is actuated by a float 54 to maintain the level of the water in the tank at the level of that float 54. Above this water level, the walls of the tank are provided with one or more screened air-inlet openings 56 through which air can enter the upper end of the tank to reach the air-inlet opening 18 of the blower formed by the blades 36.

The float switch 52 controls the power supply to the pump motor 4 and the disk motor 26. The switch 52 is connected to a suitable supply circuit 58 and is connected by a pair of wires 60 to the motor 4 and by a pair of wires 62 to the motor 26.

The detention tank 50 is connected near the bottom, conveniently through a manual valve 64, to a booster or pressure pump 66 driven by a motor 68, and the outlet of the pump 66 is connected through a check valve 70 and a pipe 72 to the bottom of a pressure tank 74. The outlet of the pressure tank 74 is connected to the bottom inlet of a filter 76 whose outlet 78 is connected to the domestic water-service system. The pressure tank 74 contains an air cushion in its upper end, and the air volume in that tank is maintained by an air-volume control 80 operatively connected to the intake side of the pump 66 by a tube 82. The pressure tank carries a pressure-responsive switch 84 having suitable supply leads 86 and connected by a pair of wires 90 to control the pressure-pump motor 68.

Operation of the apparatus shown in Fig. 1 is as follows: With the float 54 in lowered position, the float switch 52 is closed, to supply current to the pump motor 4 and the disk motor 26. The pump 3 driven by the motor 4 supplies water through the pipe 40 to the liquid inlet 38 leading to the center of the rotor 34 driven by the motor 26. In our standard domestic unit, the disk rotates at about 3450 R. P. M., and water is fed to it at the rate of about 10 gallons per minute. When the water falls onto the upper surface of the disk 34 it is carried outward to the periphery of that disk and is discharged in an atomized annular sheet-like stream outwardly toward the outer wall 12 of the conical casing 10. Concurrently, air is drawn into the upper end of the tank 50 through the air-inlet openings 56 and into the blower inlet 18, and is discharged by the blower blades 36 in an annular-expanding stream or blast, directed outwardly and upwardly into convergence with the standing stream or sheet of liquid discharged from the upper surface of the disk 34. The combined streams are forcibly impinged against the downwardly sloped conical wall 12, and the combined action of the spinning disk and the blast of air and the impact atomizes the water to small size droplets and violently and thoroughly mixes it with the air. The downward slope of the conical wall 12 deflects the liquid downwardly into the relatively quiescent zone in the trough 16. The general direction of air flow is outward from the blower and upward through the standing sheet of atomized water to the air-outlet openings 20 above the mixing zone. A relatively strong stream of air is used, and in our standard domestic unit having an 8-inch diameter disk, the high-speed blower supplies air at a rate of about 75 cubic feet per minute.

While the treatment time in this apparatus is short, and the treatment rapid, the violence and thoroughness with which the water is mixed with constantly renewed fresh air from the blower results in substantially complete release of dissolved gases and substantially complete saturation of the water with oxygen from the air, and the released gases are rapidly and constantly carried away with the air-discharge stream through the collecting chamber 22 and the stack 23, so that no reabsorption occurs. Despite the violence of the action and the thoroughness with which the water is broken up, but little water is lost in the air stream, usually substantially less than five percent.

The water deflected downwardly to the trough 16 drains from that trough into the upper end of the tank 50, where it is exposed to the intake air from the openings 56, and then drops into the tank 50. As the water level in the tank 50 rises and lifts the float 54, the float switch 52 opens and shuts off both the pump motor 4 and the disk motor 26.

When the pressure in the pressure tank 74 is below the cut-in pressure for which the pressure switch 84 is set, that switch will be closed to energize the pressure-pump motor 68. The pump 66 will then operate to withdraw water from the detention tank 50 and to fill the pressure tank 74 to the proper pressure and level. When the pressure tank reaches the cut-out pressure for which the switch 84 is set, that switch 84 will open and de-energize the pump motor 68. The withdrawal of water from the detention tank 50 will lower the float to again actuate the well pump 3 and the disk motor 26, and additional water will then be treated and delivered to the detention tank. The pressure pump 68 will thus be operated periodically in response to water-service demands, and the treatment unit 10—50 will be operated periodically in response to demands of the pressure pump.

As water is used from the pressure tank, it first flows therefrom through the filter 76, where it will be filtered to remove suspended solids from the water.

In the modification shown in Fig. 3, the well pump 103 delivers water to a raw-water storage tank 100, and operation of the pump motor 104 is controlled by a pressure-responsive switch 184 which operates to maintain the water level and pressure in the tank 100 within predetermined limits. The raw-water storage tank 100 is connected by a pipe 140 to the inlet conduit 38 of the atomizing-oxidizing device, and flow through that pipe 140 is controlled by a valve 142 actuated by a solenoid 144. The valve 142 is normally closed, and is opened by the solenoid 144 when that solenoid is energized by closing of the float switch 52.

In this modification, as in the modification of Fig. 1, the float switch 52 is responsive to the water level in the detention tank 50. When that water level drops, the float switch 52 is closed to actuate the disk motor 26 and to open the valve 142 to cause a supply of raw water to flow from the tank 100 to the inlet 38 to the rotating disk. Water may be withdrawn from the tank 50 by the same apparatus shown in Fig. 1.

The following are examples of the use and results of our method and apparatus.

*Example 1.*—Apparatus as shown in Fig. 1 was installed in a number of domestic, motel, and restaurant installations in Florida. Well water in Florida commonly contains considerable quantities of contaminating hydrogen sulphide and other gases which give the water a bad odor and a bad taste, and of carbon-dioxide gas which with the other gases present tend to make the water acidic and to maintain other impurities in solution in the water. The water also commonly contains objectionable amounts of soluble iron compounds and soluble compounds of other metals such as manganese and strontium. Much effort and money has been expended in Florida to overcome the presence of these contaminants in the available water. It is common to expose the water in sprays and open tanks to the atmosphere, and such treatment causes some of the gases to escape and some of the dissolved solids to precipitate. It is common to pass the water through successive ion-exchange or other chemical beds or columns intended to remove iron, to remove hydrogen sulfide, and to remove salts which cause hardness. But these treatments are far from satisfactory, and the treated water still has bad taste and odor, ice made from it is colored, laundries and housewives use excessive amounts of soaps and still cannot wash clothes white, cooks cannot make good coffee because of the bad water, etc. Many residences and restaurants use only bottled water for drinking and other human consumption. We thus found in Florida a long-standing and unsatisfied need for better water treatment. Our installations have uniformly succeeded in satisfying that need.

Apparatus illustrated in Figs. 1 and 2 was installed, and for household installations a standard size unit was used having a 30-gallon detention tank on the top of which was mounted an atomizing-oxidizing device containing an 8-inch spinning-disk atomizer driven at 3450 R. P. M. by an electric motor. The water-feed rate was normally 10 gallons per minute of operation of the unit, and the blower carried by the spinning disk was adapted to deliver 75 cubic feet of air per minute. The unit is of relatively small-physical size, about 18 inches in diameter and 5 feet tall, and is thus readily adapted for domestic installation. The installation of these units was relatively simple, and required merely setting the unit in place, connecting its water intake to the existing water-supply source, connecting its outlet to the existing water-delivery system, adding a filter, and connecting the stack outlet from the atomizing-oxidizing chamber to a 5-inch diameter sheet-metal stack.

The results produced in these installations were uniformly good, producing water which was crystal clear and free from odor and objectionable taste. In a number of cases where the raw water was acidic, the treated water was neutral or slightly basic.

Chemical tests, made by the Florida State Board of Health at a representative installation, "for reduction of dissolved sulfides revealed 100% removal of this objectionable material by passage of the water through the unit." Actual amounts of dissolved sulfides (expressed as $H_2S$) found were as follows:

|  | P. p. m. |
|---|---|
| In raw water | 2.7 |
| In effluent from the atomizing-oxidizing device to the detention tank | 1.7 |
| In water delivered to the service system, after the filter | 0.0 |

Tests for iron, made by the Florida State Board of Health on results in a household size unit but with a 5-gallon detention tank and a small filter (and mounted on a trailer for demonstration and test purposes), gave the following results:

|  | P. p. m. |
|---|---|
| Iron in raw water, as Fe | 2.3 |
| Iron in effluent from unit (after filter) | 0.27 |

With respect to these iron tests, the Board of Health report commented: "Above results indicate satisfactory reduction of dissolved iron by passage of an iron-bearing water through the trailer mounted unit with a retention time of twenty minutes in the aerator reservoir. Again we are inclined to believe that even more satisfactory results could be secured on installations where flow rates approach actual operating conditions."

We have carried out numerous tests for oxygen absorption in water processed at various rates through the standard household unit shown in Figs. 1 and 2 and described above. The tests for oxygen content in the water were made by the standard method known as the Winkler process. At water-feed rates up to 10 gallons per minute (with disk rotation at 3450 R. P. M. and air supplied at 75 cubic feet per minute) those tests regularly showed 100% saturation in the water draining from the atomizing-oxidizing chamber. At higher feed rates, the percentage saturation progressively fell off.

We have made a number of tests to determine the percent of water lost during treatment in our standard household unit, as by evaporation or entrainment in the air passing through the atomizing chamber. At a treatment rate of 10 gallons of water per minute and an air-feed rate of 75 cubic feet per minute, these tests regularly showed a water-loss of less than 2 percent.

Example 2.—A quantity of water was saturated with ferrous sulfate having a solubility of about 26 parts per 100 parts of water, and this strong solution was treated by our process in equipment similar to that shown in the drawing. The water introduced into the equipment was clear and substantially free from suspended particles. The liquid mixture discharged from the atomizing-oxidizing chamber contained large amounts of suspended solids, and this mixture was passed to a filter. The filter used was a plain sand filter. The water draining from the filter was clear and free from suspended particles. It was tasteless, and tests showed it to contain only .05 part per million of iron.

Example 3.—Separate quantities of mineral water were obtained from the Pluto Spring, the Proserpine Spring, and the Bowles Spring, at French Lick, Indiana. In each case the water was clear but had a strong characteristic odor and taste.

Each of these waters was passed through an atomizing-oxidizing device like that shown in Fig. 2. In each case, the water collecting in the trough at the bottom of the atomizing-oxidizing chamber was no longer clear, but contained suspended solids. The water was then filtered through a 3-inch layer of silica sand. The purified water which drained from the filter was clear and free from odor and taste.

Example 4.—An effort was made to find a well in the vicinity of French Lick, Indiana, producing the worst water. A quantity of water was obtained which was quite black in color, had a strong brackish taste and a strong odor. A well driller in the vicinity referred to it as "black sulfur water," and it contained a high concentration of hydrogen sulfide. This water was processed in an atomizing-oxidizing device like that shown in the drawing, and subsequently filtered. During the processing, a strong odor of hydrogen sulfide was carried in the air discharged from the device, and it was desirable to collect such air and to discharge it through a high stack. The water collected in the bottom of the atomizing-oxidizing chamber contained large quantities of suspended solids. The filter used was a plain sand filter. The treated water flowing from the filter was clear and colorless, free from odor and taste, and had a specific gravity of 1.00, indicating the substantial absence of dissolved solids.

Example 5.—A quantity of polluted water was withdrawn from the White River within 500 feet downstream from the outfall from the sewerage plant of the city of Anderson, Indiana. The water was extremely turbid, it had a chlorine demand of more than 14 parts per million, and contained dissolved oxygen in the amount of not over 4 to 5 parts per million. It showed a bacterial count of 60,000 per cc. Such water was treated by our process in apparatus similar to that shown in the drawing. The water collecting in the bottom of the atomizing-oxidizing chamber was passed to a filter consisting of a 3-inch layer of ordinary sand. The filtered water recovered was clear, colorless, and tasteless. Its chlorine demand was not over 4 parts per million, representing a reduction of 71% over the chlorine demand of the raw-polluted water. Its dissolved oxygen content was 8.6 parts per million, representing 95% of saturation. Its bacterial count was only 2 per cc.

Purification of such raw water for human use would normally require (1) a settling step with a retention time of at least one hour, (2) pre-chlorination with about 8 parts of chlorine per million parts of water, (3) the addition of coagulent and flocculent compounds, (4) a flash mixing to distribute those compounds, (5) a period of mild agitation to effect coagulation and flocculation, (6) the addition of expensive activated carbon during such agitation period, (7) settling in a settling basin for a retention period of two to three hours, (8) a sand filtration, and (9) a post chlorination with about 5 parts per million of chlorine. By the use of our atomizing-oxidizing device, steps 1 through 7 of the normal procedure outlined above are eliminated, and replaced by a single rapid atomizing-oxidizing treatment. Our invention thus renders unnecessary a large part of the extensive installations normally required, it avoids the normal heavy pre-chlorination and its persistent effects, it eliminates the cost of other additives, and it gives water of improved taste even without an expensive activated carbon treatment.

The results of our process and apparatus, as shown by the foregoing examples, are most surprising, both to us and to observers familiar with the problems involved. In some cases, our process provides a relatively simple and inexpensive solution to problems which have heretofore been considered difficult and troublesome. In other cases, the process yields results of a wholly unexpected character and which to the best of our knowledge have not heretofore been accomplished, especially with such simple equipment and procedure. In some cases, notably with iron solutes, and perhaps also with polluted water, the solutes removed are evidently oxidizable contaminants and the results obtained may be attributed, in part at least, to the oxidation of those oxidizable contaminants to relatively insoluble products.

We claim as our invention:

1. The rapid process of treating water to remove hydrogen sulfide and soluble iron compounds, and substantially saturate the water with oxygen, which comprises feeding the water to the center of a rapidly rotating disk, discharging the water from the periphery of said disk to form an annularly expanding standing thin sheet of water, forcibly blowing into convergence with such standing sheet an expanding annular stream of fresh air at a rate exceeding about five cubic feet of air per gallon of water discharged, impinging the resulting mixture of water and air against a deflecting barrier, thereby atomizing the water and substantially saturating the water with oxygen from the air, removing the water from the mixing zone in the direction of deflection from said barrier and freely discharging the air and separated gases in an opposite direction, collecting the water and constituents carried thereby, detaining the collected constituents in a detention tank for a detention time of at least about twenty minutes to allow the dissolved oxygen to react with oxidizable contaminants, and subsequently filtering the water to remove suspended solids therefrom.

2. The process of treating water as defined in claim 1 in which the air is blown into convergence with the water at a rate of about 7.5 cubic feet of air per gallon of water.

3. The process of purifying water as set forth in claim 1, with the addition that the collected constituents are detained in the detention tank at a pressure not exceeding atmospheric pressure.

4. The process of treating water as set forth in claim 1, in which the oxygen-saturated water is first detained in a detention tank at a pressure not exceeding atmospheric pressure for a reaction time of about twenty to sixty minutes, is then stored in a demand-responsive pressure tank, and is then filtered.

References Cited in the file of this patent

UNITED STATES PATENTS

| | | |
|---|---|---|
| 767,195 | Zerbe | Aug. 9, 1904 |
| 1,318,774 | La Bour | Oct. 14, 1919 |
| 2,237,711 | Morgan | Apr. 8, 1941 |
| 2,237,882 | Lawler et al. | Apr. 8, 1941 |
| 2,239,612 | Lawler | Apr. 22, 1941 |
| 2,543,813 | Stover | Mar. 6, 1951 |
| 2,590,431 | Rose | Mar. 25, 1952 |
| 2,591,134 | Canariis | Apr. 1, 1952 |